US005675732A

United States Patent [19]
Majeti et al.

[11] Patent Number: 5,675,732
[45] Date of Patent: Oct. 7, 1997

[54] DYNAMIC CHANNEL ASSIGNMENT FOR TCP/IP DATA TRANSMITTED VIA CABLE TELEVISION CHANNELS BY MANAGING THE CHANNELS AS A SINGLE SUB NETWORK

[75] Inventors: Venkata Chalapathi Majeti, Naperville, Ill.; Mark Meir Rochkind, Morristown, N.J.

[73] Assignee: Lucent Technologies Inc., Murray Hill, N.J.

[21] Appl. No.: 435,048

[22] Filed: May 8, 1995

[51] Int. Cl.$^6$ .................................................. G06F 13/00
[52] U.S. Cl. .................... 395/200.01; 348/384; 370/118; 370/53
[58] Field of Search .................... 370/60.1, 94.1, 370/85.13, 18, 95.3, 85.7, 118, 53; 340/825.03; 358/133, 136; 375/38; 348/12, 384; 395/200.01

[56] References Cited

U.S. PATENT DOCUMENTS

| | | | |
|---|---|---|---|
| 4,831,373 | 5/1989 | Hess | 340/825.03 |
| 4,870,408 | 9/1989 | Zdunek et al. | 340/825.03 |
| 5,038,209 | 8/1991 | Hang | 358/136 |
| 5,058,133 | 10/1991 | Duncanson et al. | 375/38 |
| 5,115,309 | 5/1992 | Hang | 358/133 |
| 5,159,592 | 10/1992 | Perkins | 370/85.7 |
| 5,239,545 | 8/1993 | Buchholz | 370/95.3 |
| 5,313,467 | 5/1994 | Varghese et al. | 370/94.1 |
| 5,347,304 | 9/1994 | Moura et al. | 348/12 |
| 5,441,630 | 8/1995 | Gagliardi et al. | 370/85.13 |
| 5,444,703 | 8/1995 | Gagliardi et al. | 370/60.1 |
| 5,479,407 | 12/1995 | Ko et al. | 370/94.1 |
| 5,519,691 | 5/1996 | Darcie et al. | 370/18 |
| 5,586,121 | 12/1996 | Moura et al. | 370/404 |

FOREIGN PATENT DOCUMENTS

| | | |
|---|---|---|
| 57-207443 | 12/1982 | Japan. |
| 3-175828 | 7/1991 | Japan. |
| 4-317225 | 11/1992 | Japan. |

OTHER PUBLICATIONS

Yum, Tak-Shing Peter, "Dynamic Channel Assignment in Integrated-Services Cable Networks," IEEE Transactions on Communications, pp. 2023–2027 Apr. 1994.

Yum, Tak-Shing, "Dynamic Channel Assignment in Integrated-Services Cable Networks," IEEE, pp. 92–98 1991.

"Dynamic Channel Allocation," IBM Technical Disclosure Bulletin, pp.315–316 Aug. 1993.

"Load Balancing for Variable Sized Connections with Dynamically Changing Bandwidth Requirements," IBM Technical Disclosure Bulletin, pp. 435–438 Oct. 1992.

*Primary Examiner*—Thomas C. Lee
*Assistant Examiner*—Duo Chen
*Attorney, Agent, or Firm*—Jack R. Penrod

[57] ABSTRACT

A system which avoids the bandwidth inefficiencies of simply providing multiple separate and independent channels for distributing data services over television compatible networks by considering the multiple channels as one unit and managing them as one unit with an upstream bandwidth management unit. This bandwidth management unit dynamically assigns active users to unused bandwidth among multiple channels. To accomplish this, the bandwidth management unit records each request for channel bandwidth that is made, each request that is being actively fulfilled, and each request that has been completed. Thus, data service providers, such as multimedia services, can efficiently use multiple 6 megahertz television network compatible channels to distribute their data to many requesters/users at high rates of speed over a relatively inexpensive existing network.

13 Claims, 2 Drawing Sheets

DYNAMIC CHANNEL ASSIGNMENT FOR TCP/IP DATA TRANSMITTED VIA CABLE TELEVISION CHANNELS BY MANAGING THE CHANNELS AS A SINGLE SUB NETWORK

TECHNICAL FIELD

The invention relates to data communication and more particularly to data communication via cable television systems.

DESCRIPTION OF THE PRIOR ART

One known high-speed data communication system capable of data rates of 10 Mega bits per second is the asymmetric system of Moura et al. described in U.S. Pat. No. 5,347,304, which is hereby incorporated by reference. The system of Moura et al. transmits digital information in the form of packets to any remote location such as a home, school, or office using standard cable television practices and components. FIG. 1 shows such a system 100 that has an end user PC 104 with an IEEE 802.2 interface 106 connected to the Remote Link Adapter (RLA) 108 via coaxial cable 110. RLA 108 acts as a router for the PC 104. The RLA 108 supports a coaxial connection 112 for downstream data delivery to PC 104 and a telephone modem connection 114 for upstream user signaling and control. As shown in FIG. 1, data packets addressed to PC 104 are routed to a network router 120, where the data packets are transformed into a 6 MHz RF carrier signal compatible with NTSC television standards. The data is then distributed over a conventional cable network. However, this known asymmetric system 100 is for a single user system and a data rate that did not require more than a single cable channel having a maximum of 6 Mhz.

The system of Moura et al is not readily expandable to provide service to multiple users both from a bandwidth point of view and from an address point of view. Further, simply providing each of multiple users with a channel assignment and a unique internet protocol address typically leads to needless duplication of routing and related hardware and inefficient allocation of bandwidth among multiple channels. If a channel is actually assigned more users than it can service at one time, at a heavy usage time a user that is pre-assigned to one channel may not be allowed access to that channel because of usage, while a second channel may actually be under utilized. Thus, there is a need in the art for a multiple user high speed data system that does not require duplication of hardware and which can load share among multiple channels to use bandwidth efficiently.

SUMMARY OF THE INVENTION

Briefly stated, the problems of the prior art are solved and the state of the art advanced by providing a system delivering data services which efficiently uses channel bandwidth across several channels, such as cable television channels. The system dynamically assigns users to empty bandwidth of two or more channels. The system has a network for communicating data packets according to internet protocol to a local network unit. The local network unit is connected to this internet protocol network and operates as a bridge from internet protocol to a group of frequency division multiplexed channels that are compatible with television program distribution. This local network unit bridges the data packets from the network to the channels. A number of single user data units are connected to this local network unit via one of the channels, each is connected in order to receive its respective data packets. Each of these single user data units has a unique address to distinguish it from the other single user data units. The system also has one or more data service provider units, each of which is connected to the internet protocol network for transmitting data packets to the local network unit and the channels for distribution to respective single user data units requesting data services. Each of these data service provider units is also connected to each single-user-data-unit-to-which-it-transmits-data-packets via another communication path for controlling the transmission of data packets. Further, the system has a bandwidth manager that is connected to the data service provider units and the local network unit via the internet protocol network. This bandwidth manager keeps a dynamic record of an amount of bandwidth used of each of the channels and assigns any new bandwidth allocation for data services to the channel which has the most available bandwidth remaining.

In another aspect of the invention, the problems of the prior art are solved and an advancement in the art is achieved by providing a method for delivering data services efficiently. The method includes the steps of: communicating data packets according to internet protocol via a first network; receiving the data packets from the first network and multiplexing the data packets by a local network unit onto a second network having a plurality of channels; receiving the data packets by a plurality of single user data units that are connected to the second network upon one of the plurality of channels, each of the single user data units having a unique address; distributing data packets from a plurality of data service provider units to the single user data units via the first network, the local network unit, the second network and the plurality of channels of the second network; controlling the distributing of data packets from each of the data service provider units to each single user data unit to which it transmits said data packets via another communication path outside of the first network; and dynamically managing these channels with a bandwidth manager that is connected to the plurality of data service provider units and the local network unit via the network. The bandwidth manager keeps a dynamic record of each amount of bandwidth used of each of the plurality of channels and uses this record to fulfill any new bandwidth request for data services to the channel which has the most bandwidth available.

DETAILED DESCRIPTION

Figure 1:
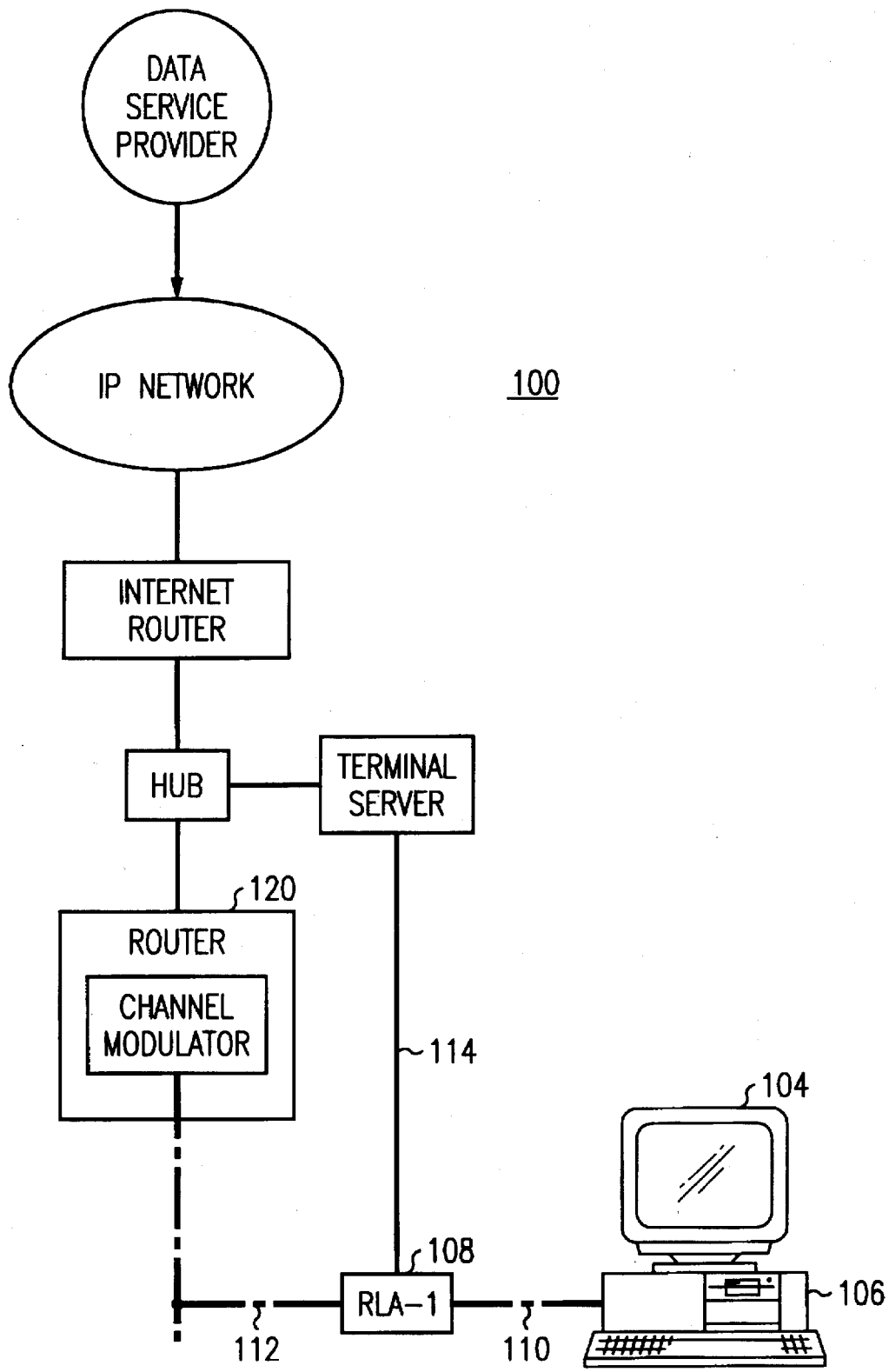
FIG. 1 is a block diagram of a known data delivery system.
Figure 2:
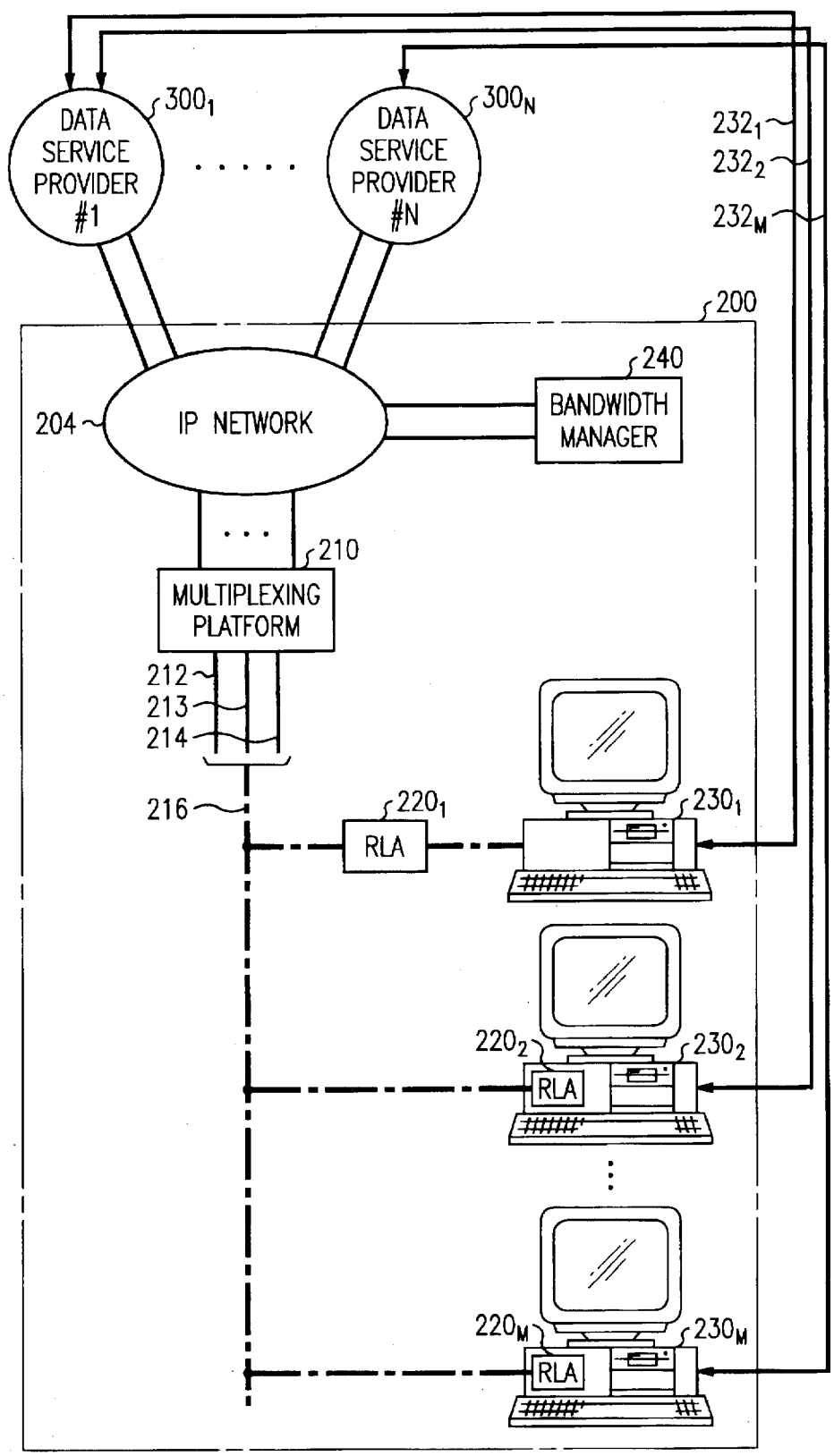
FIG. 2 is a block diagram of a data delivery system with dynamic channel assignment and management according to the present invention.

Referring now to FIG. 2, a data delivery system 200 is shown. The system 200 connects data service providers $300_1$–$300_N$ to single user data units $230_1$–$230_m$, which are end users. The data service providers $300_1$–$300_N$ may be providing online data services such as text, stock quotes, multimedia, video games, etc.

Data service providers $300_1$–$300_n$, are connected to an internet protocol (IP) network 204 and can send and receive data packets thereby. Also connected to internet protocol network 204 is a multiplexing platform 210. Multiplexing platform 210 receives data packets in internet protocol and multiplexes and modulates them into one of a number of frequency channels. In one embodiment of the present invention, the multiplexing platform 210 modulates the data packets received from the IP network 204 into one of two or more 6 megahertz wide television compatible channels. The modulation used is compatible with existing television signal equipment, so the modulated data packets are distributed using the same equipment as cable or free space broadcast television signals. Three channels 212, 213, and 214 are shown, but any number greater than two is considered within the scope of the invention. Channels 212, 213, and 214 are transported via a common media 216, such as CATV cable, optical fiber, or even free space.

Common media 216 is connected to remote link adapters (RLAs) $220_1$–$220_M$, which may be independent units such as $220_1$, or may be part of another unit. Each RLA $220_1$–$220_M$ demodulates and demultiplexes the data packets on the one of the channels 212, 213, or 214 to which it is tuned. Each RLA $220_1$–$220_M$ is channel agile and may be tuned in response to a signal from the head end bandwidth manager 240 to any channel 212, 213, or 214. RLA $220_1$ converts the demodulated data packets into a IEEE 802.2 protocol data packets and forwards the data packets to the single user data unit $230_1$, which may be a data terminal, a work station, a personal computer, or some other type of data equipment. The RLAs $220_2$–$220_M$ are part of single user data units $230_2$–$230_M$, thus RLAs $220_2$–$220_M$ demodulate and demultiplex data packets on their respective channels and transmit these packets directly to single user data units $230_2$–$230_M$ via respective internal buses. Different RLAs may be dynamically configured to use different amounts of channel bandwidth, e.g., 150 kbps, 300 bps, etc. Once the data packets reach their respective single user data units $230_1$–$230_M$, the data packets may be treated as any other data packet. So, to a great extent, the intermediate stages between data service providers $300_1$–$300_N$ and single user data units $230_1$–$230_M$ are transparent to the data packets.

The distribution of data packets from the data services providers $300_1$–$300_N$ to single user data units $230_1$–$230_M$ through multiplexer platform unit 210 is primarily one way, which means that a second path of some type must exist in order to have some type of control on the packet data, assuming it is not a pure broadcast arrangement such as commercial television.

Each single user data unit $230_1$–$230_M$ also has a connection available $232_1$–$232_M$ to any one of the data providers $300_1$–$300_N$ via a narrow bandwidth data line such as a telephone line or a back channel line of some cable television distribution systems. The single user data units $230_1$–$230_M$ communicate over the narrowband line using a modem or some other suitable low data rate device. The connections $232_1$–$232_M$ when established are two way data paths, so establishment of a connection and requests for data can be forwarded and acknowledged.

Also part of the system 200 is a bandwidth manager 240. Bandwidth manager 240 is connected to data service providers $300_1$–$300_N$ via IP network 204. Bandwidth manager 240 is also connected to multiplexing platform unit 210 via IP network 204. Bandwidth manager 240 is an important part of managing the bandwidth of the connections. Bandwidth manager 240 may be a built-in function of the multiplexing platform 210, or remain independent as shown in FIG. 2 in order to manage a distributed architecture with several multiplexing platforms in a given region (not shown). The role and rationale for the bandwidth manager 240 is derived from an assumption that the current data service providers will evolve into more multimedia services. If one of the data service providers $300_1$–$300_N$ is able to respond to a request from a specific user, the request is forwarded to the bandwidth manager 240 requesting bandwidth for high speed distribution to the requesting user. The request may be for data to be delivered at one of a set of rates, e.g., 150 kbps, 300 kbps, 1.5 megabps, etc.

The multiplexing platform 210 operates all of the supported channels 212, 213, 214 as part of one sub-network address. In order to determine how data from data service providers $300_1$–$300_N$ is routed to a channel modulator, the bandwidth manager 240 collects traffic and utilization statistics for each channel. The bandwidth manager 240 also receive notifications from the data service providers when a user session terminates so that the assigned bandwidth of that session can be reassigned. The assignment of a channel at data service request and negotiation time and the release of that channel after the distribution of the requested data as described in the present invention is called dynamic channel assignment.

The are three key steps involved in providing dynamic channel assignment. The first step in achieving dynamic channel assignment is to manage all multiplexing platform channels as part of one subnetwork. Additionally, each of the single user data units $220_1$–$220_M$ may be dynamically tuned to any of the available channels. In order to send incoming data on any given channel 212–214 to any given single user data unit $220_2$–$220_M$, the multiplexing platform 210 needs to maintain an active routing table that specifies each single user data unit destination address and the corresponding channel modulator employed. This ensures that data destined to single user data units is transmitted on an appropriate channel.

The next step to achieving dynamic channel assignment is to use a routing table to direct incoming data to appropriate single user data unit address. Management of routing table is tightly coupled to the single user data units that are actively involved in receiving data over common media 216. When a new single user data unit $230_1$–$230_M$ initiates a session requiting channel bandwidth (say on Channel 30) the utilization statistics of the bandwidth manager routing table would be adjusted by an amount of channel bandwidth requested and allocated. Similarly, when a session is terminated, the utilization statistics representing the channel of the terminated session is adjusted by the amount of channel bandwidth released. Channel assignment for each user request is provided by bandwidth manager as part of the service negotiation process. Assignments are based on channel utilization statistics at the time that a new request is processed. Use of service negotiation process to increment and decrement active user statistics for each channel is a departure from current known systems, which instead use pre-assigned channels.

The third step to providing dynamic channel assignment is distinguishing active single user data units from all other subscribers in a given serving area. This is accomplished during the service negotiation process just after a single user data unit of units $230_1$–$230_M$ completes a narrowband connection, if wide band distribution services are necessary. Channel assignments are communicated from the bandwidth manager 240 back to each single user data unit either via the narrowband connection thereto, or via broadcast on the respective default channel of the RLA of the single user data unit. This information is maintained in the bandwidth manager 240.

The important part of managing all channels as part of one sub-network is what distinguishes the role of the multiplexing platform 210 from a generic IP router. In the case of a genetic IP router (not shown), each channel modulator having an independent sub network address simplifies how incoming data packets are routed from the IP network to the channel modulator and to an active single user data unit. Without violating any general networking principles, a generic router with a built-in scheme to balance load across all of the supported channels could be built. However, the natural evolution of data service distribution leads to requirements for multiplexing platform 210 and bandwidth manager 240 beyond that of a generic router. These further requirements include:

1. Channel assignments, keys for encryption/decryption, and other secure communications are sent to via the narrow band modem connection. In practice, this requirement will provide a separate physical path from the path 216 used for data communications. This provides an extra level of security needed for single user data units retrieving sensitive information (e.g., stock quotes, telecommuting to corporate networks).
2. Informing each RLA to listen to the channel to which it is assigned. In a generic IP router, this task can be accomplished by simply broadcasting on all channels a command to tune a specific RLA to its respective assigned channel. Since the generic router approach uses the same physical path to tune the RLAs as the one in which data is transmitted, here is an inherent security problem. System 200 according to the present invention envisions the use of the narrow band connection—which would be a separate physical or logical medium from the path carrying data transmissions—to tune each of the RLAs. One embodiment of the invention has the narrow band connection connected directly to the service provider, which negates the ability of a generic IP router ability to go directly through the service provider narrow band connection to tune the RLA. Each of the data service providers has a respective application program interface that is used by the present invention to pass channel assignment data from the bandwidth manager 240 over the narrow band connection to perform the RLA channel tuning as part of service negotiation process.
3. Keeping records of the channel bandwidth requests for purposes of billing, traffic measurements, and bandwidth management.
4. Providing admission control to ensure that only authorized information is sent over the channels to the single user data units. In the IP world, anyone who has knowledge of the destination address can send unwanted and unwarranted messages.
5. Maintaining quality of service by limiting the number of active users of any one channel to a pre-defined maximum level of channel bandwidth utilization or limiting the number of active users of any one channel to a pre-defined maximum number.

Routing, load balancing across channels, collection of traffic measurements, and encryption for secure communications are part of the multiplexing platform unit 210. On the other hand, limiting the number of users per channel to optimize use of channel bandwidth or to maintain quality of service, and the to use loading and traffic data to bill the data service provider requires sophisticated data base management work. Experience suggests that decoupling of management functions can result in better performance for the multiplexing platform unit 210. Further, deploying a regional bandwidth manager 240 to control several multiplexing platforms (not shown) allows the benefits of the economies of scale. In this context, a bandwidth manager 240 will perform data service negotiation, billing of the service provider, end user data base management, admission control to maintain quality of service, passing the channel assignment and encryption keys, (via the service entity providing the channel assignment and the encrypted data) and necessary network management functions. Thus, the bandwidth manager performs many tasks while also managing the available bandwidth on each of the channels that ultimately deliver the data services.

Thus, it will now be understood that there has been disclosed a new apparatus and method for distributing data services from data service providers. While the invention has been particularly illustrated and described with reference to preferred embodiments thereof, it will be understood by those skilled in the art that various changes in form, details, and applications may be made therein. For example, Although plural data service providers are shown in FIG. 2, the present invention would work just as well with only one data service provider. It is accordingly intended that the appended claims shall cover all such changes in form, details and applications which do not depart from the true spirit and scope of the invention.

What is claimed is:

1. An apparatus for delivering data services from a plurality of data service providers to a plurality of single user data units, comprising:

a network for communicating data packets according to TCP/IP protocol;

a local network unit connected to said network by a plurality of NTSC compatible channels and having a plurality of channels for multiplexing data packets from said network upon said plurality of NTSC compatible channels;

said local network unit manages said plurality of channels as a single sub network instead of managing each channel individually;

a plurality of single user data units connected to said local network unit via one of said plurality of channels for receiving data packets, each of said single user data units having a unique internet address assigned thereto;

a plurality of data service provider units, each of said data service provider units is connected to said network for transmitting data packets according to TCP/IP protocol to said single user data units via said local network unit and said plurality of NTSC compatible channels;

each of said data service provider units is respectively connected by an individual channel to each single user data unit to which the respective data service provider transmits said data packets, each of said individual channels for controlling said transmission of data packets to a respective single user data unit; and a bandwidth manager connected to said plurality of data service provider units and said local network unit via said network, said bandwidth manager keeps a dynamic record of an amount of bandwidth used of each of said plurality of channels and assigns any new bandwidth allocation for data services to the NTSC compatible channel which has a largest amount of bandwidth available to fulfill the new bandwidth allocation for data services.

2. The apparatus of claim 1, wherein said dynamic record is incremented for each amount of bandwidth that is allocated from a channel at the time of a request to deliver data, and decremented for each amount of bandwidth of a channel that is freed up after all data packets related to the request have been delivered to the respective single user data unit.

3. The apparatus of claim 2, wherein said local network unit maintains a routing table that specifies the single user data unit address and a channel modulator of the allocated channel to provide data packet routing.

4. The apparatus of claim 1, wherein said local network unit maintains a routing table that specifies the single user data unit address and a channel modulator of the allocated channel to provide data packet routing.

5. The apparatus of claim 4, wherein each of said channel modulators and the single user data units connected thereto are managed by said local network unit.

6. The apparatus of claim 1, wherein said NTSC compatible channels are six megahertz wide, which is the bandwidth of standard broadcast television channel and hence the standard cable television channel.

7. The apparatus of claim 1, wherein said TCP/IP data packets are modulated onto said NTSC channels using a type of modulation that is compatible with a network of cable television cables and cable television distribution amplifiers.

8. The apparatus of claim 1, wherein said NTSC compatible channels are contiguous frequency channels of a CATV network.

9. The apparatus of claim 1, wherein said local network unit receives and converts the data packets addressed to its plurality of single user units from the NTSC compatible signals into IEEE 802.2 protocol data packets and routes each stream of data packets to its respective single user unit over a respective connection therebetween.

10. The apparatus of claim 9, wherein said connection is a local area network, LAN, that communicates according to IEEE 802.2 protocol.

11. The apparatus of claim 1, wherein one of said data service provider units transmits data in said data packets which are encrypted.

12. The apparatus of claim 11, wherein key sequences for encryption are delivered to each of the data service providers transmitting encrypted data via a respective individual channel of said individual channels.

13. The apparatus of claim 12, wherein each said data service provider unit providing encrypted data uses a user provided key to encrypt the data within the data packets before that data leaves the data service provider unit and is propagated over said TCP/IP network.

* * * * *